July 23, 1957 A. F. MESTRE 2,800,643

MATRIX MEMORY SYSTEMS

Filed May 27, 1955 4 Sheets-Sheet 1

INVENTOR
AUGUSTE F. MESTRE

BY William V. Schelberg
AGENT

July 23, 1957 A. F. MESTRE 2,800,643

MATRIX MEMORY SYSTEMS

Filed May 27, 1955 4 Sheets-Sheet 2

INVENTOR
AUGUSTE F. MESTRE

BY William V. Schellberg
AGENT

July 23, 1957 A. F. MESTRE 2,800,643

MATRIX MEMORY SYSTEMS

Filed May 27, 1955 4 Sheets-Sheet 3

INVENTOR
AUGUSTE F. MESTRE

BY William V. Schelberg
AGENT

INVENTOR
AUGUSTE F. MESTRE
BY William C. Schelberg
AGENT

United States Patent Office 2,800,643

Patented July 23, 1957

2,800,643

MATRIX MEMORY SYSTEMS

Auguste F. Mestre, Saint-Maur-des-Fosses, France, assignor to International Business Machines Corporation, New York, N. Y., a corporation of New York Application May 27, 1955, Serial No. 511,737

Claims priority, application France November 16, 1954

13 Claims. (Cl. 340—174)

The present invention relates to memory systems and is directed particularly to apparatus for improving the signal response from a coincident current operated magnetic core memory array.

The cores employed in such an array have magnetic characteristics that allow them to attain one or the other of two stable states respectively characterized by a negative or positive remanent induction. A field of ±H switches them from one state to the other, whereas a field of $\pm H/2$ produces only slight changes in their remanent induction. These magnetic fields are produced by windings that are arranged so that each individual core is linked by a particular combination of windings comprising three wires X, Y and Z, which allow the remanence state of any one core to be ascertained and selectively controlled.

Storage of binary information in a selected core is accomplished by sending current impulses $\pm i/2$ into each of the two wires X and Y which traverse this core, the coincident application of these two currents producing a field ±H that is capable of changing its state of stability.

During the reading of a particular core, the X and Y coordinate windings are pulsed and individually develop a field $\mp H/2$, in the same manner as for the storing function but of opposite direction. In response to coincident read impulses, a signal is or is not available on the output line Z according to whether the binary information 1 or 0, respectively, has or has not been established in the particular core as represented by its remanence state. The read-out line Z traverses several cores only one of which is pulsed through both coordinate windings X and Y to change its stable state and generate a signal, however, a number of these other cores are subjected to the action of a half select field $\pm H/2$ and generate stray signals. The number of cores contributing half select signals depends upon the capacity of the matrix, and the amplitude of the individual stray signals depends upon the rectangularity of the hysteresis characteristic of the cores employed. The sum of these half select or stray signals may be of the same order of magnitude as an information signal and prevent its determination in that a 0 signal from the selected core may appear as a 1 signal. Detection of the remanence state of a core is made all the more delicate as the amplitude of an information signal is constant, whereas the amplitude of the stray signals is variable since its magnitude depends upon the particular remanence state at which the corresponding core happens to be at the moment of read out. Under these conditions, use of a fixed threshold device for eliminating these variable half select impulses is not feasible.

Certain devices are known that have been developed for performing this detection either by time sampling the signal or by performing an amplitude comparison, but these devices are generally complicated, require using cores having hysteresis loops very close to the ideal rectangular shape, and do not permit the capacity of the matrix to be increased.

One object of the present invention is to provide apparatus for eliminating the strays or half select signals caused by the induction changes of the various magnetic cores partially energized by the coordinate read-in lines related to a predetermined core of the matrix. This apparatus comprises means for ascertaining the magnitude of the strays developed in response to pulsing one coordinate line by a test operation performed either before or after the read operation. The strays developed as a result of half select pulses applied to the other read-in line are eliminated immediately before the read operation.

Another object of the present invention comprises providing a system for determining the amplitude of the strays generated by the impulse communicated to one coordinate read-in line through a test performed before or after read out with the signal determined by this test being developed to set up a variable level threshold which allows the signal corresponding to the information to be separated from that resulting from the strays.

Another object of the present invention comprises the provision of apparatus for cancelling the action of the variable amplitude strays, as determined either before or after reading, through establishing a variable level threshold; with the characteristics of the associated circuits being such that the edges of the selecting impulses used to read the core may have a relatively long rise time.

Another object of the present invention comprises providing apparatus and process for determining strays $P_x$ coming from a first read-in line X and negating the action of strays $P_y$ coming from a second read-in line Y associated with the same core, through the provision of means devised for communicating to lines X and Y two current impulses $T_x$ and $T_y$, of duration $t$ and $2t$ for example, such that during the second interval $t$ the coincidence of pulses $T_x$ and $T_y$ causes switching of the particular core.

Particular advantages of the invention reside in overcoming the difficulty caused by the inherent fluctuating character of the strays and in allowing the permissible number of strays on the same read-out line to be increased and as a consequence, to allow the capacity of the matrix to be increased without increasing the burden of selectivity placed on the associated circuitry.

Another advantage of the invention resides in the ability to use impulses that are not so sharply defined as those heretofore required, which simplifies the generation and transmission of these impulses.

Other objects of the invention will be pointed out in the following description and claims and illustrated in the accompanying drawings, which disclose, by way of example, the principle of the invention and the best mode, which has been contemplated, of applying that principle.

Figures 1, 2, 3:
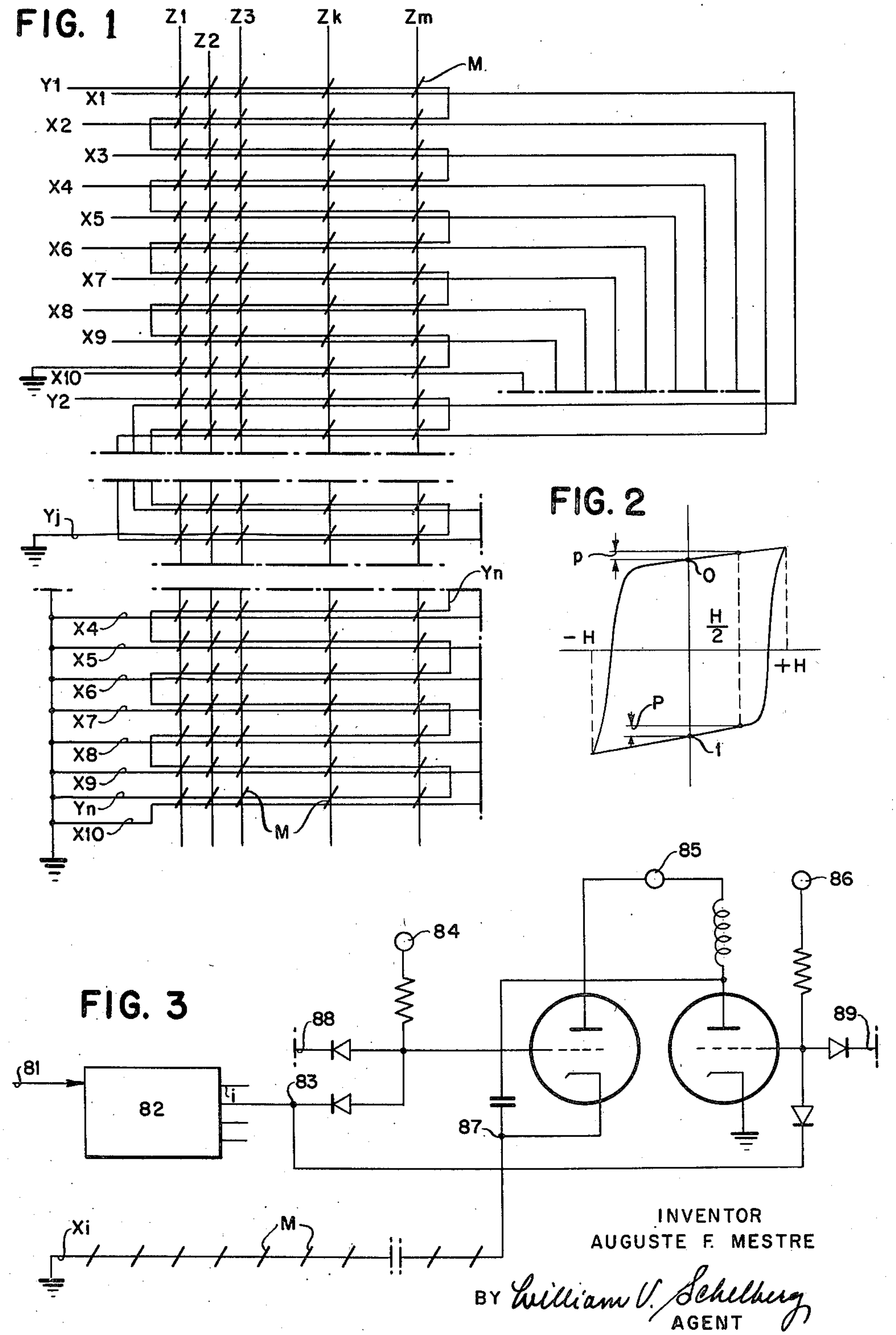
Figure 1 is a diagram representing a magnetic core matrix with its assembly of lines designed for the recording and read-out of information.
Figure 2 is a characteristic hysteresis curve of a magnetic core such as that employed in the matrix of Figure 1.
Figure 3 represents an impulse generator of the type employed for energizing one or the other of the two coordinate lines X or Y as required for selection of a core.

Referring now to Fig. 1, a magnetic core matrix is schematically represented and comprises a plurality of magnetic cores M, shown for example as being distributed among *n* groups each having 10 lines and *m* columns. In the form illustrated, a first assembly of horizontal wires X1 . . . X*i* . . . X10 is arranged so that X*i*, representative of any one of the X wires selected, traverses all the cores of a representative line of order *i* in groups *n*; with a second assembly of horizontal wires Y1 . . . Y*j* . . . Y*n* arranged so that Y*j* traverses all the cores of group *j*; and finally, *m* vertical wires Z1 . . . Z*k* . . . Z*m* arranged so as to traverse the 10 cores situated in the same column in each of *n* groups. Thus it is possible to determine a selected core of the matrix by means of its three coordinate lines X*i*, Y*j* and Z*k*. It is quite obvious that the representation of Fig. 1 is diagrammatic and it must be understood that currents generated in lines X*i* or Y*j* drive all the magnetic cores they traverse in an identical way so that these currents lead to the same change whatever the order concerned.

The magnetic cores M used in the array have well known characteristic curves, as that shown in Fig. 2, such that a field +H switches them from state 1, characterized by a negative remanent induction, to state 0, characterized by a positive remanent induction; while a field —H switches them from state 0 to state 1. On the other hand, a field of $\pm H/2$ magnitude which is less than the coercive force is not enough to switch them. The effect of a field $+H/2$ is restricted to causing a very slight change of the core induction, indicated in the figure as P or *p* respectively.

Storage of information in such a matrix is performed through selection of a wire X*i* and a wire Y*j* each of which traverses a particular word line of the matrix. If impulses of intensity $\pm i/2$ are directed simultaneously to these two wires, their combined effect is to deliver a current $\pm i$ which creates a field ±H that is sufficient to cause switching of the cores in that word line. Wires X*i* and Y*j* link cores in other than the selected word line and therefore subject the cores they traverse individually to a field $\pm H/2$, which field is ineffective to cause a change in the residual state. On the other hand, with word line X*i*, Y*j* traversed by current —*i*, for example, each core of the line will have its remanence state shifted to represent a binary 1 unless a positive current pulse is sent into the vertical lines Z which traverse these cores, generating a field which opposes the field generated by the two wires X*i*, Y*j* and thus inhibiting the entering of a 1.

Read-out of information from such a matrix is performed as follows: if the core linked by windings X*i*, Y*j*, Z*k* is to be read-out, for example, a positive current impulse $+i/2$ is sent into each wire X*i* and Y*j*, thus causing all the cores of line X*i*, Y*j* to switch to the 0 representing residual state and read-out signals are simultaneously delivered to all the vertical lines Z. In the selected line Z*k*, if core X*i*, Y*j*, Z*k* contains a 0, there is no output signal; on the other hand, if it contains a 1, an output signal is detected. Besides the core X*i*, Y*j* and Z*k* that is liable to be switched over in the chosen example, the line Z*k* is linked by $(n-1)$ cores traversed by the line X*i* and therefore subjected to $+H/2$ and also by 9 cores traversed by the line Y*j* and also subjected to $+H/2$. Since these cores may be in remanence state 1 or 0, susequent slight variations of induction P or *p* (Fig. 2) are caused, and a stray signal of variable intensity is also delivered to the line Z*k* and may range about the same value as that of the desired information signal.

Figure 4:
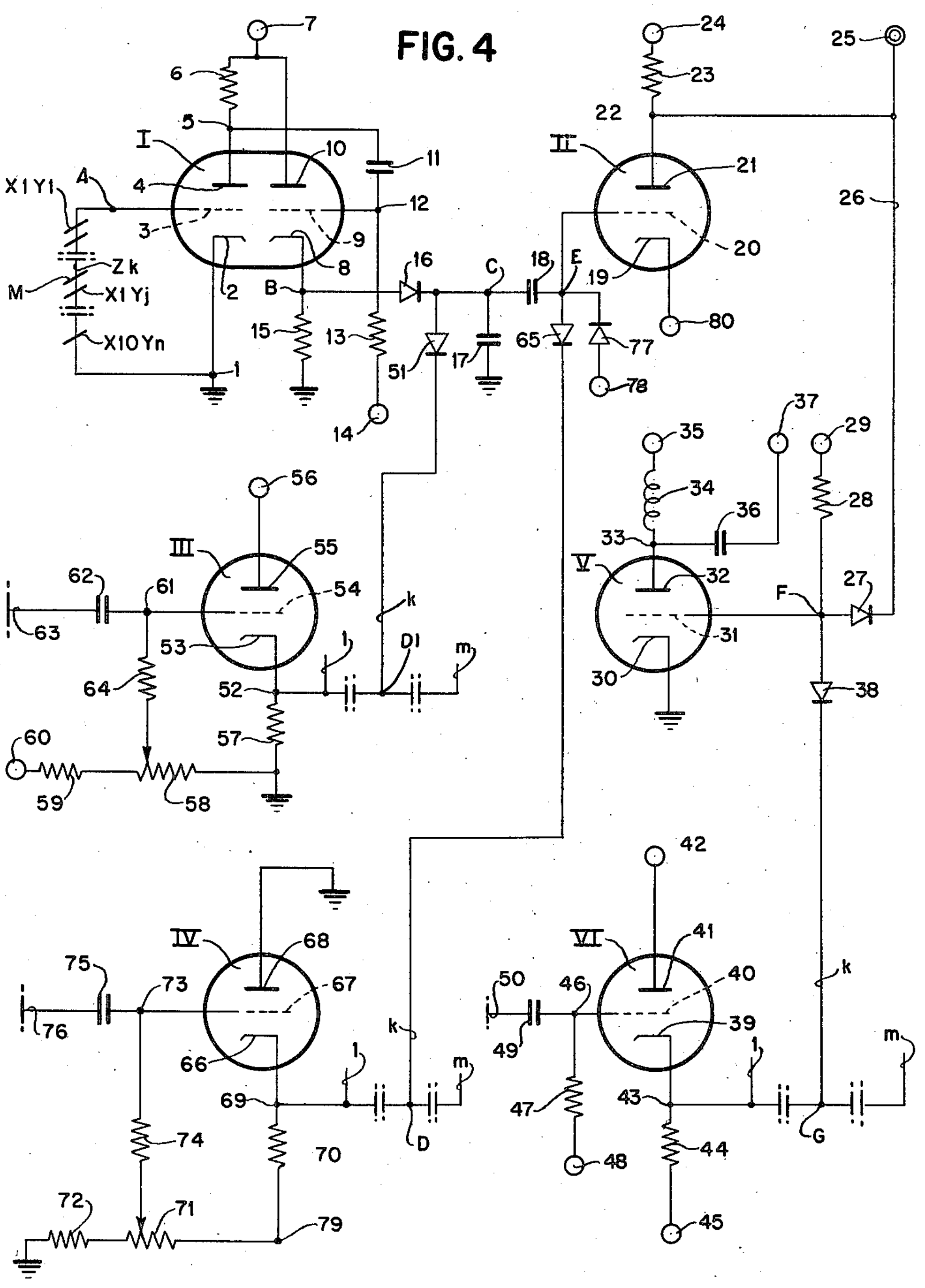
Figure 4 represents a circuit arrangement for predetermining the level of strays or half-select signals according to the invention and functioning also to read-out and restore information in the array.

Referring now to Fig. 4, the components of a read-out network have been represented. Read-out line Z*k* is again taken for purposes of explanation and has one of its ends connected to ground through a terminal 1. The line Z*k* follows the column of order *k*, traversing cores X10, **Y*n*; X9, Y*n*; . . . X2, Y1; X1, Y1 and leads to a point A shown connected to the control grid 3 on the left side of a double triode I which, in the development of the device hereby discussed, is of the 12AT7 type. This double triode I has its left side operating as an amplifying stage and its right side operating as a cathode-follower. The left side cathode 2 is connected through point 1** to the end of the line Z*k* and to ground. Anode 4 of the left side is connected through a junction 5 and through a resistor 6 of 47,000 ohms to a terminal 7 that is supplied with a potential of +150 volts. Junction 5 is connected through a capacitor 11 of 150 μμf. and a point 12 to the control grid 9 of the right side of double triode I. Right side cathode 8 of the double triode I is connected through a point B and a resistor 15 of 2,000 ohms to ground, with the anode 10 connected to the aforementioned terminal 7. Point B, the normal potential of which is +20 volts, undergoes the amplified and reversed variations of the potential developed at point A. Point 12 is connected through a resistor 13 to a terminal 14 which is held at +18 volts. Point B is connected to point C through a diode 16, which may be of the 6AL5 type, with the potential of point C normally maintained at +20 volts. Diode 16 is rendered conductive when the potential of point B overrides that of point C, and allows the potential of C to follow the potential of B when the latter rises and to retain the increased potential through a capacitor 17. Point C is connected to ground through the capacitor 17, which has a capacitance of 330 μμf. and is provided for storing the voltage level of the strays generated by current X. Point C is also connected to a point E through a capacitor 18 of 150 μμf. Point E is connected to a terminal 78 through a diode 77, which may be of the 6AL5 type, with a bias of —100 volts applied to this terminal. The presence of this diode prevents the potential of point E from falling below —100 volts. On the other hand, point E is coupled to the control grid 20 of a triode II which, in the particular embodiment illustrated, is of the 6J6 type. The acthode 19 of tube II is connected to a terminal 80 that is held at —95 volts and the anode 21 is connected through a point 22 and a resistor 23 to a terminal 24 that is held at a potential of +25 volts. Tube II is biased so as to be normally cut off and becomes conductive when the potential of point E rises to —95 volts, whereupon a negative pulse is delivered to a terminal 25, constituting the output signal terminal of the network.

The grid 31 of a tube V of the 5687 type is connected to the anode 21 of tube II through a wire 26, a terminal F and a diode 27, which may be of the 6AL5 type. Point F is normally held at —40 volts and is connected through a resistor 28 to a terminal 29 that is held at +25 volts. Cathode 30 of the tube V is grounded and the anode 32 is connected through a point 33 and a coil 34 to a terminal 35, which is maintained at a potential of +300 volts. Point 33 is also connected to a terminal 37 through a capacitor 36 and provides an output pulse for inhibiting entry of a 1 during the restore portion of an operating cycle as will be later described. Point F is also connected to a point G through a diode 38 of the 6AL5 type. Point G is connected to a pulse line common to each of the *m* read-out networks provided for the matrix, one such network being required for each output line Z. Point G is connected through this line and a point 43 to the cathode 39 of a triode VI of the 5687 type. The cathode of the tube VI is connected through the point 43 and a resistor 44 to a terminal 45 that is held at —100 volts. The anode 41 of the tube VI is connected to a terminal 42 that is maintained at a potential of +150 volts. A lead 50, that is adapted to receive a clock pulse during each operating cycle from a general system of synchronization as provided by a calculator for example, is connected through a capacitor 49 and a point 46 to the control grid of tube VI. Point 46 is also connected to a terminal 48, held at −40 volts through a resistor 47. The assembly of tubes V and VI is provided for restoring the information read-out of the core. Tube VI supplies terminal G with a positive pulse which is transmitted to the control grid of tube V through the diode 38 unless a negative blocking pulse is provided by the reading device and transmitted through the diode 27.

Point E is connected through a diode 65 of the 6AL5 type to a point D which has a normal potential of −90 volts. Point D is connected to a pulse line common to each of the *m* read-out networks of the matrix, one being required for each Z line as mentioned previously. Point D is connected through this line and a point 69 to the cathode 66 of a triode IV which, in the illustrated embodiment, is of the 5687 type. The cathode 66 of tube IV is connected through the point 69 and a resistor 70 to a terminal 79 that is held at −100 volts. Terminal 79 is also connected to ground through a potentiometer 71 and a resistor 72. The anode 68 of tube IV is connected to ground as shown. A lead 76, also adapted to be pulsed at a certain time during each operating cycle from a general system of synchronization such as the calculator mentioned heretofore, is connected through a capacitor 75 and a point 73 to the control grid 67 of tube IV. Point 73 is also connected through a resistor 74 to the potentiometer 71. The function of tube IV is to deliver a negative pulse to the diode 65 at a time required to prevent the potential of point E from following that of point C when the latter increases. Point C is connected through a diode 51 to a point D1 that is normally held at a potential +35 volts and connected to a further pulse line common to each of the *m* read-out networks provided for the matrix. Point D1 is connected through this line and a point 52 to the cathode 53 of a triode III of the 5687 type. The cathode 53 of tube III is connected through the point 52 and a resistor 57 to ground. The anode of tube III is connected to a terminal 56 to which a potential of +150 volts is applied. A lead 63, adapted to receive a clock pulse from the general system of synchronization during each operating cycle at a time to be later described, is connected through a capacitor 62 and a point 61 to the control grid 54 of tube III. Point 61 is connected through a resistor 64 to a potentiometer 58 which is linked to ground at one end with the other end connected through a resistor 59 to a terminal 60 that is biased at a potential of +150 volts. Tube III functions to reset the device into its initial state after a read-out operation.

Figure 7:
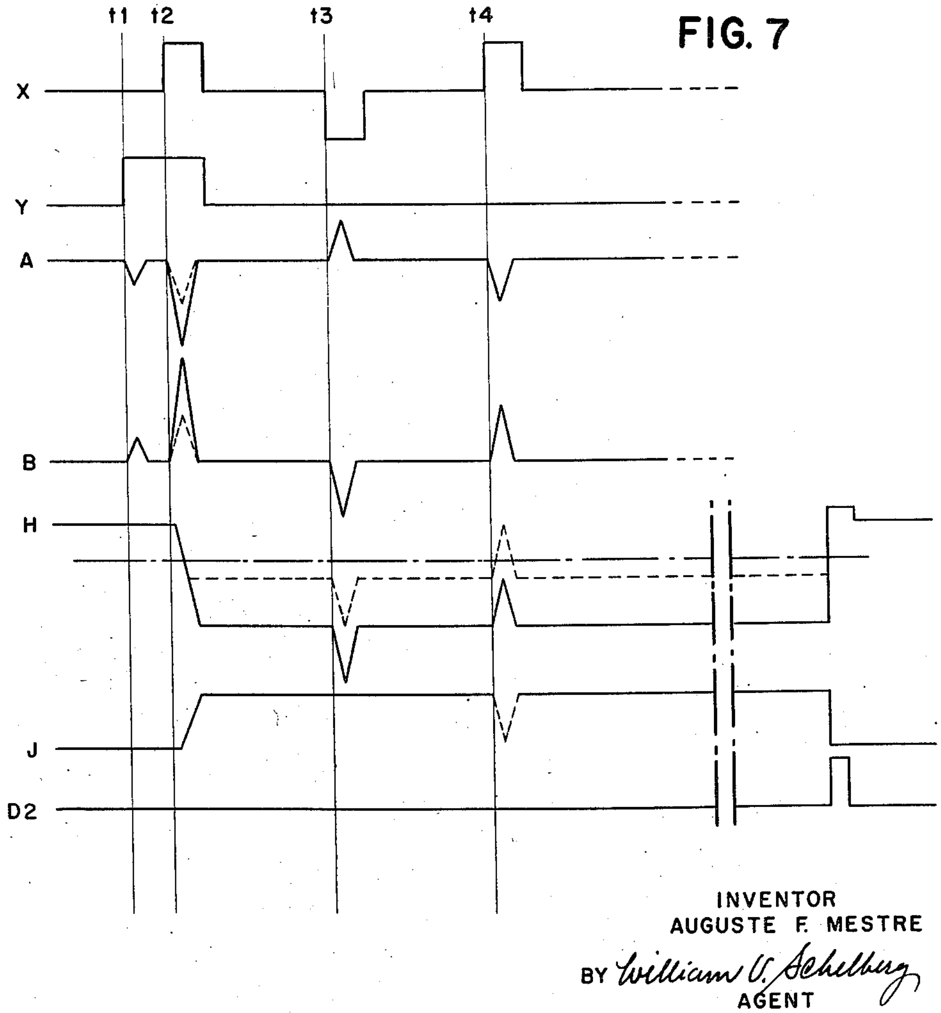
Figure 7 shows the potential variations at different points of the circuit represented in Fig. 6.

During an operation cycle, one coordinate line X*i* and one coordinate line Y*j* of the matrix is selected by address decoders, in accordance with instructions received from a calculator for example, and receive current impulses $\pm i/2$ produced by two impulse generators. Such a generator has been represented in Fig. 3 with a wire 81 from an associated calculator shown coupled to a decoder 82 which selects the particular impulse generator corresponding to the desired line *Xi*. Points 84 and 86 in the pulse generator circuit are held at a potential of +25 volts and terminal 85 is held at a potential of +300 volts with the diodes coupled to these terminals normally conductive. During a reading cycle, the potential of point 83 rises at the time that a positive impulse is directed either to wire 88 or to wire 89, according to the general system of synchronization, and a positive or negative current impulse is applied to line X*i* which is connected between point 87 and ground. A similar device operates for line Y*j*. These impulses are designated X and Y as represented in Fig. 7. In this figure, the full-line impulse trains correspond to the read-out of a binary 1 while that part of the impulse trains corresponding to the read-out of a binary 0 is represented by dotted lines. The following times shall be considered:

T1: Determining the stray or half select signals due to application of a current impulse X.

T2: Restoring of the magnetic state of the cores linked by line X*i* and pulsed with a half select read current.

T3: Preparation for read-out and production of the stray or half select signals due to current impulse Y.

T4: Read-out and actual production of the information signal superposed on the strays.

T5: Preparation for the eventual restoration of information state 1 in the considered core.

T6: Actual restoring of information state 1.

T7: Resetting the read-out device.

Since the signal appearing at T4 time contains only the stray signal generated by line X*i*, one method corresponding to the invention comprises determining the value of this stray at T1 time and deriving the difference between the total signal and this stray at T4 time.

Figure 5:
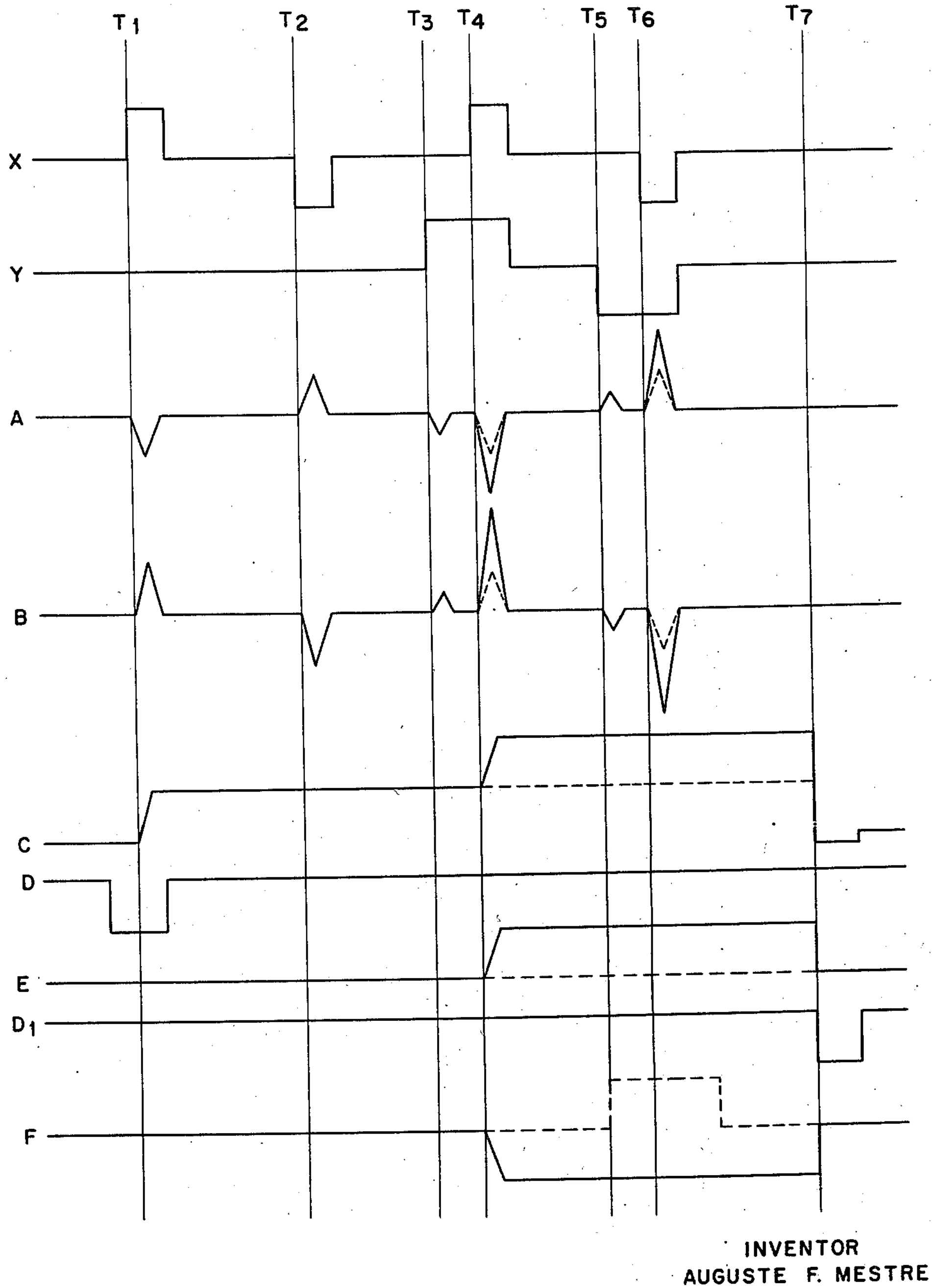
Figure 5 shows the potential variations occurring at different points of the circuit represented in Fig. 4 at various times in an operating cycle.

A better understanding of the mode of operation of the system will result from the following explanation made with reference to Figs. 4 and 5. At time T1 the X impulse is applied and a signal is developed on the read-out line Z*k* appearing at point A to be amplified, inverted and of low impedance as it appears at B through the amplification and cathode-follower stages of tube I. Capacitor 17 is charged through the diode 16 to the peak voltage appearing at point B since diode 51 does not conduct until time T7 as will be noted later. Point E, maintained at a voltage of −100 volts at time T1 by the voltage applied to point D and transmitted by diode 65, does not follow the potential of point C due to the presence of the capacitor 18 which consequently charges.

At T2 time, a negative current impulse X restores the magnetic state of the cores traversed by line X*i* and slightly demagnetized at time T1.

Impulse Y begins at T3 time and prepares for switching the cores of the selected line. As this impulse is initially applied, the stray or half select signals from the cores linked by line Y are developed. According to the particular embodiment of the matrix, the stray signals generated at time T3 may be lower or higher than that generated at time T1. A short impulse of opposite direction may be introduced to block the effect of this action or the interval between times T3 and T4 made sufficient to allow this stray to decay.

At T4 time, the X and Y pulses are coincident so that the word line is read out and point A receives a signal corresponding either to the same stray that it received at time T1 in the case where the zero is entered in the read-out core, or a signal which is the super-position of the same stray and the characteristic signal of a 1 from the particular core. This signal is again amplified and inverted appearing at point B. As previously described, the capacitor 17 is charged to the peak voltage developed at point B during T4 time when this impulse overrides the voltage developed at T1 time. As viewed in Fig. 5, point C shows a rise in level equal to the difference between the peak voltages appearing at point B at T4 and T1 time. At T4 time a clock pulse is applied to lead 76, and the diode 65 is blocked by a potential increase at point D so that point E is no longer maintained at −100 volts. Therefore, point E now follows the potential variation of point C to which it is connected through the capacitor 18.

In the case where a 0 is stored in the particular core being considered, point C does not show any potential increase at T4 time and point E remains at its initial voltage of −100 volts with tube II continuing in a non-conductive state. Point 22 then remains at the normal 25 volts level characterizing the sensing of a 0 at output line 25. At T5 time a negative current impulse is applied on line Y and normally prepares for the restoration of state 1 to core X*i*Y*j*. With a 0 having been read out, this restoration should not take place. The write pulse is initiated by a clock pulse appearing on line 50 at T5 time to cause tube VI to conduct and pulse point G. This pulse is transmitted to F through diode 38, since diode 27 then is not conductive and remains inactive.

Tube V then conducts during this impulse time and delivers a current impulse to line 37, which may be arranged parallel with the reading line and traversing core, $XiYj$ in the opposite sense or applied to the reading line Z to cause inhibition. This current impulse cancels the effect of Y impulse at T5 time so that, with the X current impulse insufficient alone to switch the core $XiYjZk$, the zero state is retained.

In the case where a 1 stored in core $Xi\,Yj\,Zk$ is read out, the potential at point C increases at T4 time and the potential at point E also increases so as to make tube II conductive. The potential at point 22 then drops below ground and this negative swing on output line 25 characterizes the read out of a 1. The negative swing on line 26 at T5 time renders the diode 27 conductive and prevents point F from following the potential of point G. As a consequence, tube V remains cut off and the inhibit line 37 is not pulsed so that the action of negative current impulses X or Y is not cancelled at T6 time, and the 1 representing remanence state is restored in the core.

It should be noted that the information is already available at point E and that the rest of the circuit described represents only a mode of utilization of this impulse.

At T7 time, a clock pulse is delivered to lead 63, firing tube III and an impulse at D1 discharges capacitor 17 through diode 51. Point C then returns to the initial state of potential (Fig. 5) and point E also undergoes a decrease of potential, limited however to −100 volts due to the bias applied through the diode 77.

It is to be seen that this reading device uses the same circuits as those which have served for storing.

Figure 6:
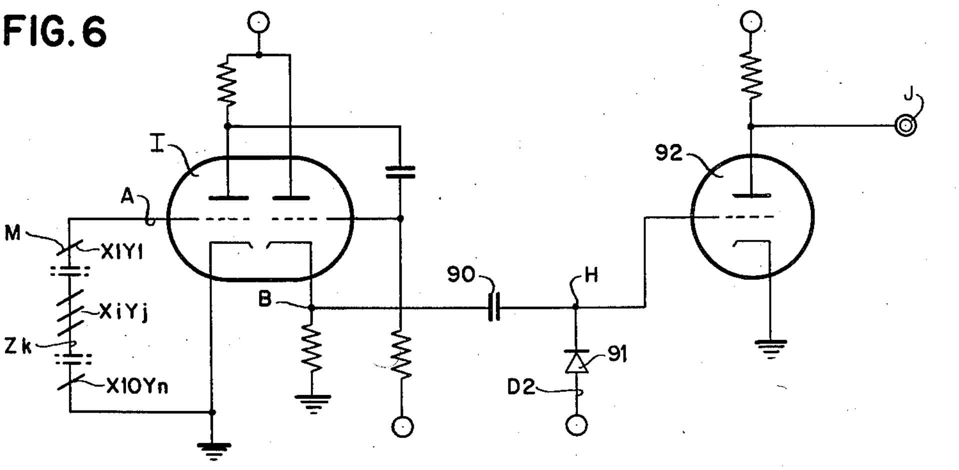
Figure 6 represents the elements of a further embodiment comprising a circuit arrangement for determining the level of the strays after read-out.

Apparatus for carrying out the invention in accordance with a second method of operation is shown in Fig. 6 where, a determination of the level of the strays generated by the impulse directed to read-in line $Xi$ is performed after reading.

In accordance with this embodiment, the Y impulse is initiated at a time $t1$, as illustrated in Fig. 7, and produces a characteristic stray which may be bucked out or allowed to decay. Read out actually occurs at $t2$ time through the coincidence of the two pulses X and Y with the resulting signal transmitted and amplified in the same way as described in connection with the first embodiment. The leading edge of the output pulse appearing at point B charges a capacitor 90 up to its peak value. Output tube 92 is normally conducting and the voltage at point H cannot rise with current flowing through the circuit traced from point B, capacitor 90, point H, control grid and cathode of the triode 92 to ground.

At the end of the impulse at $t2$ time when point B has come back to its initial potential, the potential of point H has undergone the same decrease and current no longer flows through the circuit described with the potential of point H being below the cut-off potential of triode 92. In Fig. 7 the potential variation at point H is represented with the adjacent dot-dash line indicating the cut-off potential of the triode.

At $t3$ time, the X impulse restores the magnetic condition of the cores traversed by line $Xi$, except for that core in the word line that was read out.

At $t4$ time, the stray or half select signals due to current impulse X is determined. Point H follows the potential variations at point B and during application of the X pulse at $t4$ time the potential at B, and therefore at H, rises to the value of the amplitude of the strays developed as a result of pulsing line $Xi$. When a binary 1 has been stored by the core read-out (full line curve at H in Fig. 7), the potential of point H does not override the cut-off potential of triode 92, and no signal is detected at point J. When a 0 has been stored, however, (dotted line) the potential at H overrides the cut-off potential, thus making triode 92 conductive at $t4$ time and a negative impulse, characteristic of the 0, is detected at point J.

At the end of the reading cycle, the system may be reset to the initial condition by a positive impulse transmitted to point H through diode 91 and lead D2 as shown in Fig. 7.

Although the essential characteristic of the invention as applied to several embodiments have been described and represented in the foregoing specification, it is quite obvious that the principle of operation, which generally comprises determining the amplitude of the generated strays, either before or after read out and compensating for them, could be applied to devices other than matrices comprising magnetic cores and could be used with matrices comprising any other type of elements presenting electric or magnetic hysteresis loops of analog shape and that various modifications, substitutions or changes may be made in the devices represented as well as the mode of operation presented without exercise of invention. It is the intention therefore, to be limited only as indicated by the scope of the following claims.

What is claimed is:

1. In a device for registering electrical impulses as represented by relative states of magnetic remanence, a coordinate array of bistable magnetic cores linked by windings in each coordinate dimension whereby the remanence state of particular cores is shifted in coincident pulsing of two of said windings, means for predetermining the magnitude of half select signals developed in response to pulsing one of said two windings for establishing an output signal threshold, and means for pulsing said two windings in coincidence with the pulse applied to the other of said two windings initiated prior to that applied to said one winding.

2. Apparatus for registering pulse information magnetically by the transmission of electrical impulses, comprising a plurality of bistable magnetic cores each linked by a plurality of windings including a sense winding, means for selectively applying write impulses to a pair of said windings simultaneously to jointly cause certain of said cores to assume a first stable remanence state, means for predetermining the magnitude of half select signals developed as a result of read pulsing of one winding of said pair, means for applying read impulses displaced in time but at least in partial coincidence to said pair of windings to cause said certain cores to assume a second stale remanence state and develop an output signal in an associated sense winding should said cores be in said first stable state, and means for detecting output signals in excess of said predetermined half select signals.

3. In a device for registering electrical impulses as represented by relative states of magnetic remanence, a coordinate array of bistable magnetic elements linked by windings in each coordinate dimension whereby the remanence state of particular elements is shifted on coincident pulsing of two of said windings, means for ascertaining the magnitude of half select signals developed in response to read pulsing one of said two windings, means for read pulsing said two windings in coincidence but displaced in time, and means for detecting output signals in excess of said ascertained half select signals.

4. A magnetic memory system for storage of binary representations comprising plural arrays of magnetic cores arranged in rows and columns, a first set of windings linking the cores in each of said columns, a second set of windings linking the cores in each of said rows, write means for selectively energizing one of said windings of said first set and one of the windings of said second set in coincidence and in one sense to store a binary representation as a first remanence state in a core embraced by both said energized windings, a third set of windings linking the cores in each said array, means for selectively energizing said third windings in a sense opposite to that of said write means and simultaneously therewith to prevent a change in the remanence state of the cores in selected ones of said arrays, read means for energizing a selected one of said windings of said first set in an opposite sense to develop half select signals and then in said one sense and thereafter for energizing a selected one of said windings of said second set and said selected winding of said first set displaced in time but at least in partial coincidence to cause said fully energized cores to attain a second remanence state and develop an output signal on said third set of windings, and means for detecting output signals in excess of said half select signals.

5. A magnetic memory system as set forth in claim 4 wherein said latter means includes a capacitor device charged by said half select signals.

6. In a device for registering electrical impulses as represented by relative states of magnetic remanence, a coordinate array of bistable magnetic cores linked by windings in each coordinate dimension whereby the remanence state of particular cores is shifted on coincident pulsing of two of said windings, means for pulsing said two windings in coincidence to develop a read out signal with the pulse applied to one of said windings initiated prior to that applied to the other, means for subsequently determining the magnitude of half select signals developed as a result of pulsing said other one of said windings, and means for detecting output signals in excess of said half select signals.

7. Apparatus for registering pulse information magnetically by the transmission of electrical impulses, comprising a plurality of bistable magnetic cores each linked by a plurality of windings including a sense winding, means for selectively applying write impulses to a pair of said windings simultaneously to jointly cause certain of said cores to assume a first stable remanence state, means for applying read impulses displaced in time but at least in partial coincidence to said pair of windings to thereby cause said certain cores to assume a second stable remanence state and develop an output signal in an associated sense winding should said cores be in said first stable state, means for subsequently determining the magnitude of half select signals developed by the later applied read impulse, and means for detecting output signals in excess of said predetermined half select signals.

8. A magnetic memory system for storage of binary representations comprising plural arrays of magnetic cores arranged in rows and columns, a first set of windings linking the cores in each of said columns, a second set of windings linking the cores in each of said rows, write means for selectively energizing one of said windings of said first set and one of the windings of said second set in coincidence and in one sense to store a binary representation as a first remanence state in a core embraced by both said energized windings, a third set of windings linking the cores in each said array, means for selectively energizing said third windings in a sense opposite to that of said write means and simultaneously therewith to prevent a change in the remanence state of the cores in selected ones of said arrays, read means for energizing a selected one of said windings of said second set and a selected winding of said first set displaced in time but at least in partial coincidence to cause said fully energized cores to attain a second remanence state and develop an output signal on said third set of windings, means for subsequently energizing said selected one of said windings of the first set to determine the magnitude of half select signals developed, and means for detecting output signals in excess of said half select signals.

9. A magnetic memory system as set forth in claim 8 wherein said latter means includes a capacitor device charged by said half select signals.

10. In a device for registering electrical impulses as represented by relative states of magnetic remanence, a coordinate array of bistable magnetic cores linked by windings in each coordinate dimension whereby the remanence state of particular cores is shifted on coincident pulsing of two of said windings, means for pulsing said two windings in coincidence to develop a read out signal with the pulse applied to one of said windings initiated prior to that applied to the other by an interval sufficient to allow half select signals developed by said first applied pulse to decay, means for subsequently determining the magnitude of half select signals developed as a result of the subsequently applied pulse, and means for detecting output signals in excess of the half select signals determined by the latter means.

11. In a device for registering electrical impulses as represented by relative states of magnetic remanence, a coordinate array of bistable magnetic cores linked by windings in each coordinate dimension whereby the remanence state of particular cores is shifted on coincident pulsing of two of said windings, means for predetermining the magnitude of half select signals developed in response to pulsing one of said two windings and for establishing an output signal threshold, and means for pulsing said two windings in coincidence with the pulse applied to the other of said two windings initiated prior to that applied to said one winding by an interval sufficient to allow half select signals developed as a result of the first applied pulse to decay.

12. In a device for registering electrical impulses as represented by realtive states of magnetic remanence, a coordinate array of bistable magnetic elements linked by windings in each coordinate dimension whereby the remanence state of particular elements is shifted on coincident pulsing of two of said windings, means for ascertaining the magnitude of half select signals developed in response to read pulsing one of said two windings, means for read pulsing said two windings in coincidence but displaced in time by an interval sufficient to allow stray signals developed by a pulse applied to the other of said windings to decay, and means for detecting output signals in excess of said ascertained half select signals.

13. A magnetic memory system for storage of binary representations comprising plural arrays of magnetic cores arranged in rows and columns, a first set of windings linking the cores in each of said columns, a second set of windings linking the cores in each of said rows, write means for selectively energizing one of said windings of said first set and one of the windings of said second set in coincidence and in one sense to store a binary representation as a first remanence state in a core embraced by both said energized windings, a third set of windings linking the cores in each said array, means for selectively energizing said third windings in a sense opposite to that of said write means and simultaneously therewith to provent a change in the remanence state of the cores in selected ones of said arrays, read means for energizing a selected one of said windings of said first set in an opposite sense to develop half select signals and then in said one sense and thereafter for energizing a selected one of said windings of said second set and said selected winding of said first set displaced in time but at least in partial coincidence to cause said fully energized cores to attain a second remanence state and develop an output signal on said third set of windings, a network coupled to said third windings including capacitor means adapted to be charged to a voltage level corresponding to that of the half select signals developed and adapted to block subsequently received signals of like level so as to detect output signals in excess of said half select signals.

References Cited in the file of this patent

UNITED STATES PATENTS

| | | |
|---|---|---|
| 2,691,154 | Rajchman | Oct. 5, 1954 |
| 2,691,156 | Saltz et al. | Oct. 5, 1954 |
| 2,691,157 | Stuart-Williams et al. | Oct. 5, 1954 |
| 2,709,248 | Rosenberg | May 24, 1955 |
| 2,734,184 | Rajchman | Feb. 7, 1956 |